(12) United States Patent
Ladva et al.

(10) Patent No.: US 6,803,347 B1
(45) Date of Patent: Oct. 12, 2004

(54) ADDITIVE FOR WELLBORE FLUIDS

(75) Inventors: Hemant K. J. Ladva, Cambridge (GB); Christopher A. Sawdon, Par (GB); Paul R. Howard, Great Wilbraham (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/533,750

(22) Filed: Mar. 23, 2000

(30) Foreign Application Priority Data

Mar. 27, 1999 (GB) ............................................. 9907017

(51) Int. Cl.$^7$ ................................................ C09K 9/02
(52) U.S. Cl. ..................... 507/137; 507/139; 507/263; 507/266; 507/902; 166/282; 166/284; 166/294
(58) Field of Search ................................ 507/137, 139, 507/263, 266, 902, 103, 203; 166/282, 283, 284, 294, 295

(56) References Cited

U.S. PATENT DOCUMENTS

| | | | | |
|---|---|---|---|---|
| 2,224,120 A | * | 12/1940 | Hart | ............................ 507/137 |
| 2,803,306 A | * | 8/1957 | Hower | ........................ 166/282 |
| 3,363,690 A | * | 1/1968 | Fischer | ..................... 166/280.1 |
| 3,601,194 A | * | 8/1971 | Gallus | ......................... 166/282 |
| 3,711,405 A | * | 1/1973 | Pye | ............................. 166/282 |
| 3,724,549 A | * | 4/1973 | Dill | ............................. 166/282 |
| 3,789,927 A | * | 2/1974 | Gurley et al. | ............... 166/282 |
| 3,797,575 A | * | 3/1974 | Dill et al. | .................... 166/282 |
| 3,827,498 A | | 8/1974 | Crowe | |
| 3,891,566 A | | 6/1975 | Crowe | |
| 3,898,167 A | * | 8/1975 | Crowe | ........................ 507/103 |
| 3,979,304 A | * | 9/1976 | Fischer et al. | .............. 507/103 |
| 3,979,305 A | * | 9/1976 | Fischer et al. | .............. 507/103 |
| 4,005,753 A | * | 2/1977 | Scheffel et al. | ............. 166/283 |
| 4,154,301 A | * | 5/1979 | Carlin et al. | ................. 507/137 |
| 4,971,709 A | * | 11/1990 | Tillis et al. | ................. 507/100 |
| 6,182,759 B1 | * | 2/2001 | Burger et al. | ............. 166/305.1 |

FOREIGN PATENT DOCUMENTS

GB        2 294 485        5/1996

* cited by examiner

*Primary Examiner*—Philip C. Tucker
(74) *Attorney, Agent, or Firm*—Stephen Schlather; Robin Nava

(57) ABSTRACT

A low molecular weight, high melting point, crystalline, oil soluble additive for use in wellbore fluids is provided that is preferably a ground crystalline material of melting point over 80° C., preferably over 100° C. which is readily soluble in produced hydrocarbons such as crude oil and lighter condensates, and which exhibits a molecular weight of less than 1000, and preferably less than 500, and more preferably less than 300. Its particle size can be adjusted to bridge efficiently across different pore size formations and control its solubility rate.

10 Claims, 3 Drawing Sheets

ADDITIVE FOR WELLBORE FLUIDS

This invention relates to an additive for wellbore fluids. More specifically, it pertains to an additive for modifying the properties of a filtercake formed at the boundary between wellbore and formation.

BACKGROUND OF THE INVENTION

For the production of hydrocarbon wells, boreholes are drilled into subterranean formations. Following standard procedures, a fluid is circulated during drilling from the surface through the interior of the drill string and the annulus between drill string and formation. The drill fluid also referred to as drilling mud is used to lubricate the drill bit. It also balances the formation pressure so as to prevent formation fluids to enter the borehole in an uncontrolled manner.

The industry distinguishes between largely three classes of drilling fluids: oil-based, water-based and so-called synthetic muds. Whereas oil-based muds are recognized for their superior qualities for most of the drilling operations themselves, they become increasingly undesirable due to their impact on the environment and stricter environmental legislation. Water-based muds are expected to replace oil-based mud as the drilling fluid of choice in major geographical areas.

Other fluid systems used in the oilfield industry are completion and workover fluids. By definition a completion or workover fluid is a fluid that is placed against the producing formation while conducting such operations as well killing, cleaning out, drilling in, plugging back, controlling sand, or perforating. Basic fluid functions are to facilitate movement of treating fluids to a particular point downhole, to remove solids from the well, and to control formation pressures.

Required fluid properties vary depending on the operation, but the possibility of formation damage is always an important concern. In recent years many new fluid systems have appeared, most due to the recognition of the high risk of reducing the productivity, or completely plugging certain sections of the producing zone, through contact with a foreign fluid.

A wellbore fluid typically contains a number of additives. Those additives impart desired properties to the fluid, such as viscosity or density. One class of additives is used as fluid loss agents to prevent the drilling fluid from entering into porous formations.

The basic mechanism of fluid loss control is generally the formation of a filtercake at the interface of the porous or permeable formation layers. As part of the drilling fluid is forced into the formation by the higher pressure within the wellbore, larger particles and additives are left behind and accumulate at the face of the formation. The filtercake thus formed can be regarded as a membrane that protects the formation from further invasion of wellbore fluids. Fluid-loss control agents are selected in view of their quality to form a competent filtercake.

High molecular weight, oil soluble additives have been widely used as diverting agents and in water based drilling and completion fluids. The additives help build an effective filtercake at the formation face and minimize damage. Under flowback conditions, the reservoir hydrocarbons readily dissolve the additive effectively creating holes in the filtercake and aiding formation cleanup. Having a hydrocarbon-induced breakdown of the filtercake avoids chemical intervention (clean-up) and hence can result in a very cost-effective method of drilling wells for hydrocarbon production.

Many different oil soluble additives can be used to control fluid loss. High molecular weight thermoplastic hydrocarbon resins are commonly used. U.S. Pat. Nos. 3,891,566 and 3,827,498 describe for example a mixture of two oil soluble resins, one being friable and the other pliable as fluid loss control agents and as diverting agents. The resin must be used where oil exists and therefore it cannot be used in dry gas wells or in wells with temperature above its softening point. Its high molecular weight and impurities can make it only partially soluble in hydrocarbons causing the residues to damage or block the formation.

It is therefore an object of the present invention to provide a novel class of fluid loss additives that are able to form a competent filtercake while being easily removable from hydrocarbon bearing formations.

SUMMARY OF THE INVENTION

According to one aspect of the present invention, there is provided a low molecular weight, high melting point, crystalline, oil soluble additive for use in wellbore fluids that include drilling, completion, workover, fracturing, acidizing, cementing fluids and the like.

The new additive is a wellbore-fluid additive which is preferably a ground crystalline material of melting point over 80° C., preferably over 100° C. which is readily soluble in produced hydrocarbons such as crude oil and lighter condensates, and which exhibits a molecular weight of less than 1000, and preferably less than 650.

Its particle size can be adjusted to bridge efficiently across different pore size formations and control its solubility rate. A preferred particle size range is 10000 to 1 micron.

Preferred examples of the low molecular weight crystalline additives are 1S-endo-Borneol, camphor or iodine. Other examples include beta carotene with a melting point of 184 degrees Celsius and a molecular weight of 537, lycopene (175; 537), cholesterol (150; 387), lanosterol (139; 426), and agnosterol (165:424). More preferred examples are Woolwax alcohols distillation residues (Lanolin wax), a derivative of wool grease comprised of high molecular alcohols (triterpene, aliphatic etc) and fatty acids (normal, isoacids etc) with melting point of 90 degrees Celsius and a molecular weight of approximately 425.

The invention reduces formation damage, flow initiation pressure, and increases the cleanup efficiency dependent on the formation type. Compared to other additives, the low molecular weight crystalline additive can provide some important advantages. Firstly, the conventional high molecular weight resins, during the initial stages of dissolution in produced hydrocarbons, can be plasticized by the oil to a tacky material. This tends to coalesce to a sticky mass and is very difficult to remove by dissolution. Secondly, the pressure required to start the backflow of oil through such filtercake can be high and therefore the resins have limited use in wells with low drawdown pressures. Thirdly, the level of impurities in the hydrocarbon resin can limit its cleanup. By contrast, the low molecular weight crystalline solids of this invention dissolve smoothly and quickly to give low viscosity solutions.

In a variant of the invention, it is envisaged to reduce the environmental hazards and nuisance caused be some of the new crystalline solids compounds by an encapsulating treatment.

Another aspect of the invention relates to using the novel additive as part of a well operation. Such application comprises the steps of injecting a wellbore fluid with the additive, letting the additive form a filter cake, reversing the flow by changing the wellbore pressure and dissolving the additive in the filtercake through the flowback of hydrocarbon from the formation.

These and other features of the invention, preferred embodiments and variants thereof, possible applications and advantages will become appreciated and understood by those skilled in the art from the following detailed description and drawings.

MODE(S) FOR CARRYING OUT THE INVENTION

Using 1S-endo-Borneol ($C_{10}H_{18}O$) having a molecular weight of 154 and melting point of 210° C. (410° F.), it was first bottle tested for its solubility in water, kerosene and kerosene with 5% mesitylene (aromatics) at 25° C. 2 g of the additive added to 50 ml of the test fluid was insoluble in water but dissolved completely, within 5 minutes of mixing in kerosene and kerosene with mesitylene. There was no evidence of any residues in both cases. The additive was insoluble in water at higher temperature of 80° C.

Tests were then performed to demonstrate the ability of this additive to increase the permeability of a drilling fluid filtercake when contacted with kerosene. A 2.5 inch diameter High Pressure-High Temperature filtration cell was used for the tests. Sequential static filtration tests were performed on a filter paper (2 micron pores) at 100 psi pressure and 25° C. temperature using the polymer/carbonate drilling fluid containing 10 ppb of the crystalline additive followed with kerosene. The composition of the drilling fluid is given in Table 1.

TABLE 1

Composition of a polymer/carbonate drilling fluid.

|  | lb/bbl | $gl^{-1}$ |
|---|---|---|
| $CaCl_2$ (74 g in 835 ml of $H_2O$) | 346 | 986 |
| Antifoam | 0.2 | 0.6 |
| Starch | 6.0 | 17.1 |
| Scleroglucan | 1.5 | 4.3 |
| Biocide | 0.1 | 0.3 |
| Calcium carbonate | 45.0 | 128.3 |

The effect of varying the particle size of the additive ($d_{50}$ of 400, 200, and 60 microns) was investigated. Care was taken not to disturb the filtercake when emptying the residual mud from the cell and introducing kerosene.

Figure 1:
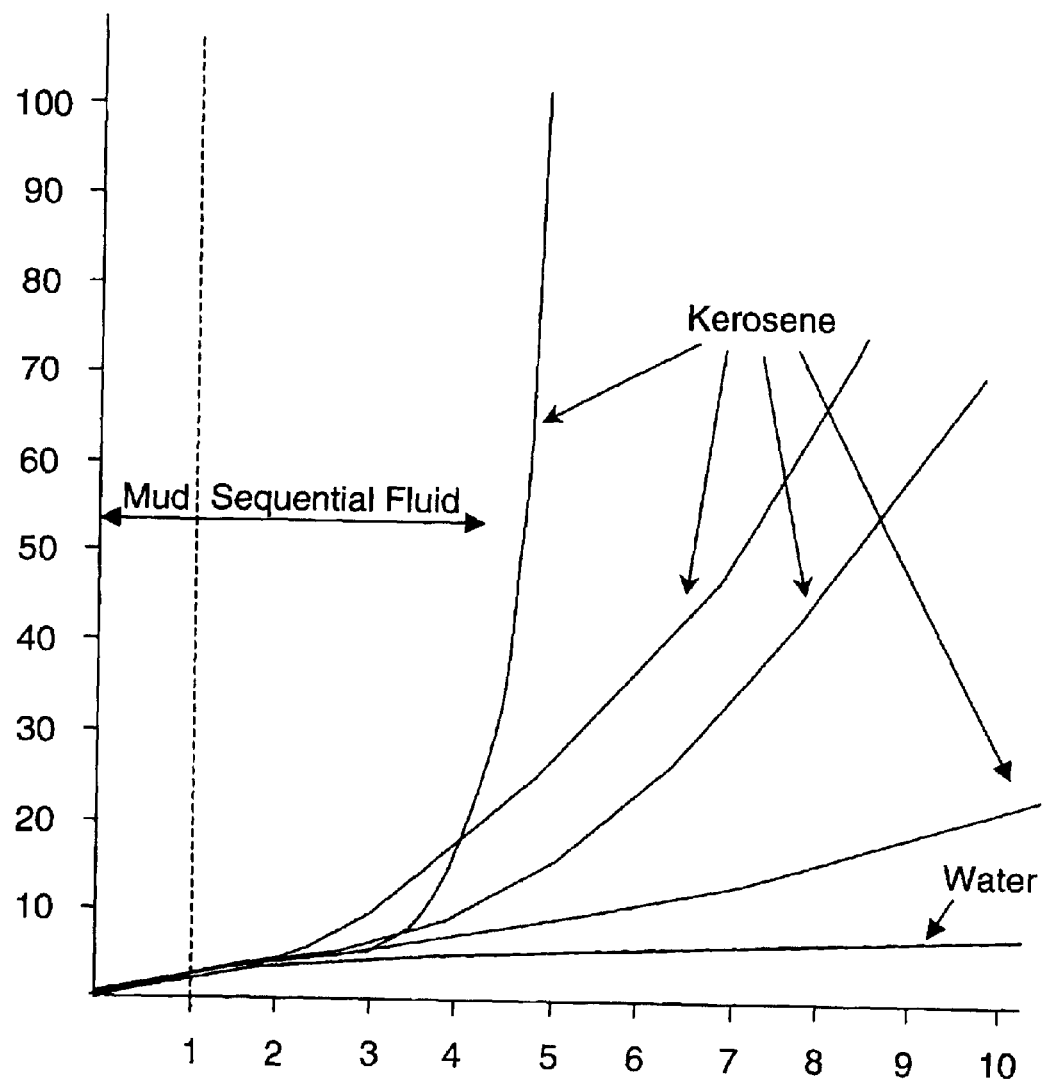
FIG. 1 shows the fluid loss behavior of a drilling fluid dependent on the additive particle size and sequential fluid using Borneol.

FIG. 1 shows the fluid loss behavior with elapsed time. After the mud cake build-up period of one hour, the kerosene dissolves the additive in the filtercake and increases its permeability to an extent that is particle size dependent. The strongest effect was observed with approximate particle size of 400 micron. But even 200 micron samples and 60 microns samples resulted in a much increased permeability. In the case of a fine grade the permeability increases by as much as 60 times whereas in the control test without the additive the rate increases by only 6 times.

Filtercake examined at the end of the test showed pinholes distributed uniformly over the entire surface due to the dissolved additive whereas in the control test the pinholes were absent.

When water is flowed instead of kerosene through a drilling fluid filtercake containing 60-micron size additive there is no change in permeability, further demonstrating the efficient removal of the additive with kerosene.

To illustrate the ability of the present invention to reduce fluid loss, formation damage and initial backflow pressure, tests were run in a High Pressure—High Temperature cell adapted for cores. The cores were 25.4 mm in diameter and 30 mm in length. Three outcrop cores (Ketton limestone, Clashach sandstone and Birchover sandstone) of widely different permeability and pore size were used. Their permeability was approximately 2400 mdarcy, 850 mdarcy and 10 mdarcy, respectively and median pore size was 60 $\mu$m, 33 $\mu$m and 2 $\mu$m, respectively. The cores were first vacuum saturated in brine (45 $gl^{-1}$ NaCl and 5 $gl^{-1}$ $CaCl_2$) and then flushed with kerosene to residual water saturation. The initial permeability to kerosene was determined from the measured steady state pressure drop across the rock corresponding to the imposed range of constant flowrates (10, 8, 6, 4, and 2 ml $min^{-1}$). The flowrates used for Birchover was 5 times lower.

Static filtration tests were conducted for 4 hours at 300 psi differential pressure and 25° C. temperature using polymer/calcium carbonate drilling fluid containing 10 ppb of 60 micron additive (in the opposite direction to the kerosene flood). After filtration the cell was depressurised and a backflow of kerosene was imposed at 1 ml $min^{-1}$ to measure the peak (FIP or flow initiation pressure) and steady state flow pressure. The peak pressure correlates with the rupture of the filtercake. The final permeability was measured using the same procedure as used for the initial permeability. The retained permeability was defined as the ratio of final to initial permeability in percentage.

As shown in Table 2, the additive gave a two-fold increase in the retained permeability and reduced the spurt loss, fluid loss and FIP in the case of large pore size Ketton. The spurt loss was higher compared with the other two rocks of smaller pore size resulting in an internal filter cake. The cleanup of this internal cake was promoted by the presence of the additive resulting in a higher retained permeability and lower FIP. In contrast, an external filter cake was mainly built on the smaller pore size rocks. With little or no internal cake, the additive contributed little to the retained permeability. However, the external filtercake with the additive was made more easily permeable indicated by a lower FIP by as much as 2 times in the case of Birchover sandstone.

TABLE 2

| Rock type | Drilling Fluid +/− Additive | Fluid loss at 4 hr g | Initial and final permeability mdarcy | Spurt loss g | Retained Permeability % | FIP psi |
|---|---|---|---|---|---|---|
| Ketton | − | 2.4 | 2619/767 | 0.63 | 29 | 5.5 |
| " | − | 2.4 | 4817/929 | 0.78 | 20 | 8.0 |
| " | + | 1.8 | 2114/1276 | 0.47 | 60 | 3.0 |
| " | + | 1.6 | 2411/1647 | 0.41 | 68 | 2.1 |
| Clashach | − | 1.4 | 999/572 | 0.15 | 77 | 5.2 |
| " | + | 1.2 | 705/540 | 0.11 | 77 | 5.0 |

TABLE 2-continued

| Rock type | Drilling Fluid +/− Additive | Fluid loss at 4 hr g | Initial and final permeability mdarcy | Spurt loss g | Retained Permeability % | FIP psi |
|---|---|---|---|---|---|---|
| Birchover | − | 1.5 | 7.2/6.8 | 0.06 | 92 | 76 |
| " | + | 1.3 | 11.7/10.2 | 0.06 | 87 | 41 |

For an encapsulating treatment Borneol particles can be ground to an average particle size of 60 microns. Then, the particles can be spray coated using Piccopale 85-55KX oil soluble resin. The resulting coating is nominally 0.1 microns thick. These particles are then added to a typical reservoir water based drilling fluid (composition same as other examples).

An further example used is lanolin wax. Its solubility in kerosene and water was qualitatively investigated by performing bottle tests at 60 degrees Celsius. Granulated lanolin with a maximum size of 500 microns dissolved completely in kerosene within 20 minutes of mixing, while being insoluble in water.

Tests were performed to demonstrate the ability of lanolin to increase the permeability of a drilling fluid filtercake (polymer/carbonate) when contacted with kerosene. Sequential filtration tests were performed with the lanolin additive in drilling fluid followed by kerosene and the fluid loss was monitored with time. Two grade sizes (500–200 microns and 60–200 microns) of lanolin was investigated. The tests were performed on a filter paper at 100 psi differential pressure and 25 C following the procedure described above. The control test was without the additive.

Figure 2:
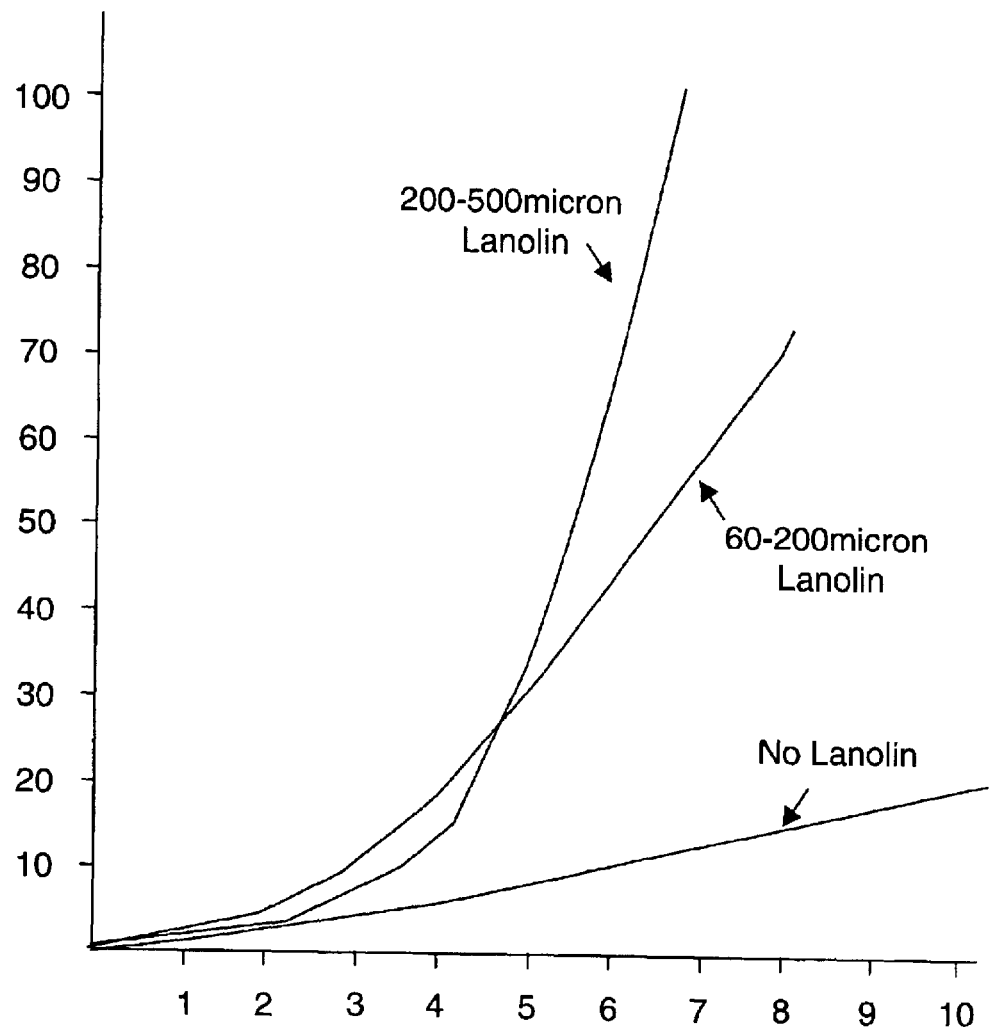
FIG. 2 shows the fluid loss behavior of a drilling fluid dependent on the additive particle size and sequential fluid using Lanolin.

FIG. 2 shows a respective 15 and 35 fold increase in fluid loss after contacting kerosene with the filtercake containing the two grades of lanolin. However, the control test without added lanolin showed no significant increase in fluid loss.

Figure 3:
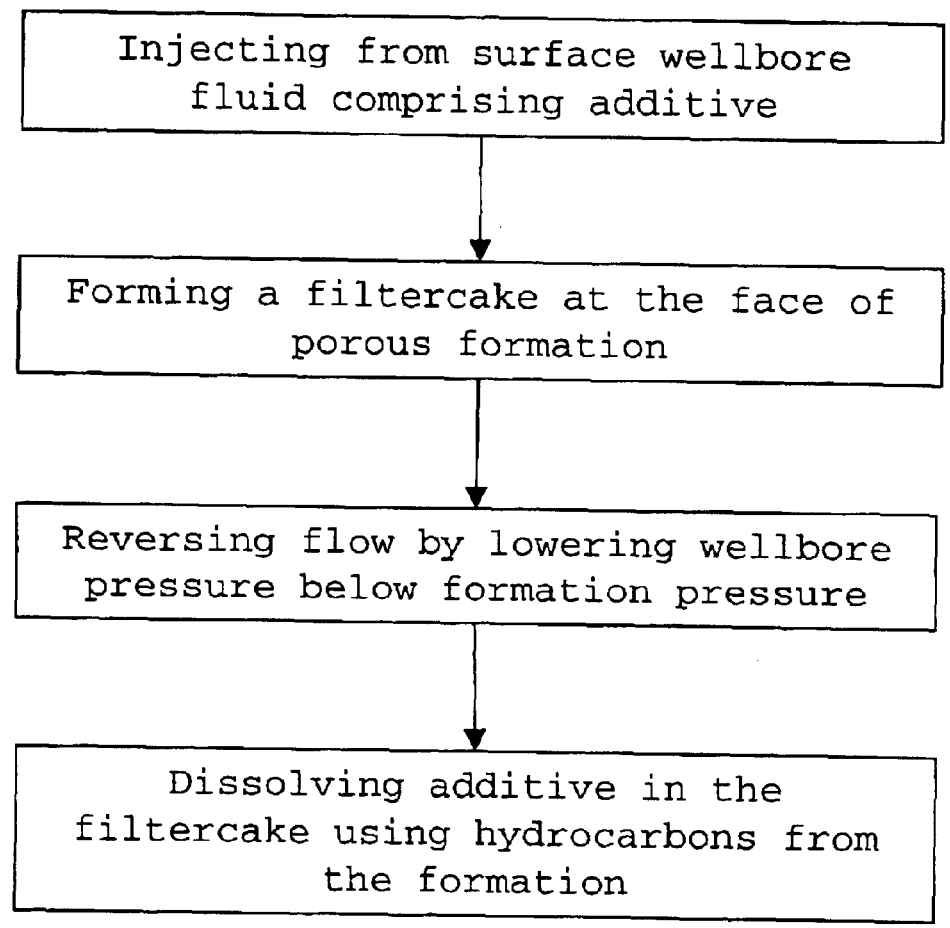
FIG. 3 summarizes steps of method to apply the novel additive in a subterranean well operation.

FIG. 3 summarizes important steps for applying the additive in a well operation. The steps can be embedded for example in a drilling operation or other operation requiring the formation and later breaking of a competent filtercake at the face of permeable subterranean formation layers.

What is claimed is:

1. A wellbore service fluid to be injected from a surface location through a well tubular into a subterranean formation, said fluid being water based and comprising a particulate additive having the properties of being crystalline, with a melting point over 80° C., soluble in hydrocarbons and insoluble in an aqueous solution, said additive comprising terpene or sterol components having a molecular weight of less than 1000 and wherein the additive is encapsulate prior to use in said wellbore.

2. A wellbore service fluid to be injected from a surface location through a well tubular into a subterranean formation, said fluid being water based and comprising a particulate additive having the properties of being crystalline, with a melting point over 80° C., soluble in hydrocarbons and insoluble in an aqueous solution, said additive comprising terpene or sterol components having a molecular weight of less than 1000 and wherein the crystalline additive, soluble in hydrocarbons and insoluble in an aqueous solution, comprises a wax.

3. A method of treating a wellbore, including the steps injecting from the surface a water based wellbore fluid comprising a particulate additive having the properties of being crystalline, with a melting point over 80° C., soluble in hydrocarbons and insoluble in an aqueous solution, said additive comprising terpene or sterol components having a molecular weight of less than 1000; letting said additive accumulate at the face of a permeable formation; reversing the flow direction and letting hydrocarbons enter said wellbore through said formation thereby dissolving at least part of said accumulated additive.

4. The method of claim 3 wherein the components have a molecular weight of less than 650.

5. The method of claim 3 further comprising the step of encapsulating the additive prior to use in said wellbore fluid.

6. The method of claim 3 wherein the melting point of the additive is over 100° C.

7. The method of claim 3 wherein the size range of the particulate additive is comprised between 1 and 10000 microns.

8. The method of claim 3 wherein the additive comprises terpene components.

9. The method of claim 8 wherein the additive comprises Borneol or Camphor.

10. The method of claim 3 wherein the additive comprises one or more components selected from the group consisting of: Borneol, Camphor, Carotene, Cholesterol, Lanosterol, Agnosterol and Lanolin.

* * * * *